United States Patent Office

2,962,410
Patented Nov. 29, 1960

2,962,410

ETHOXYLINE RESINS

Leo S. Kohn, Schenectady, N.Y., and Archie H. Horner, Trumbull, Conn., assignors to General Electric Company, a corporation of New York No Drawing. Filed Oct. 21, 1957, Ser. No. 691,173

20 Claims. (Cl. 154—140)

This invention is concerned with novel resinous compositions of matter, their preparation and their uses in coating compositions, varnishes, as binders for laminates, in molding compositions, as casting resins, etc. More particularly, the invention relates to compositions of matter comprising (1) a complex epoxide resin comprising a polyether derivative of a polyhydric organic compound, e.g., a polyhydric alcohol ether, in which the said polyether derivative contains epoxy groups which, for brevity, will hereinafter be referred to as "ethoxyline resin," and (2) a mixture of curing agents comprising (a) an alkyl titanate and (b) an organic nitrogen containing base having at least one nitrogen atom per molecule and no more than one hydrogen on each nitrogen atom, said base containing no other reactive groups. The ethoxyline resin is one having not more than about one and preferably less than about 0.2 hydroxyl groups per molecule. This application is a continuation-in-part of application Ser. No. 401,045, filed December 29, 1953, now abandoned.

In U.S. Patent 2,324,483—Castan, it is disclosed that epoxy resins comprising the product of reaction of a phenol which has at least two phenolic hydroxy groups and an epihalohydrin, e.g., epichlorohydrin, in which the said product contains at least two epoxy groups, may be converted to the substantially thermoset stage by employing as a curing agent a polybasic carboxylic acid or anhydride, for instance phthalic anhydride. In the above patent, the resinous reaction products with which the polybasic carboxylic acid anhydride is employed are complex resins comprising a polyether derivative of a polyhydric phenol containing epoxy groups and are commonly known as "ethoxyline resins" and are sold under the trade names of Epon, Araldite, Epi-Rez etc. resins. However, ethoxyline resins of this type with the aforementioned accelerating or curing agents suffer from certain disadvantages. For example, the shelf life of the partially reacted mixture of the ethoxyline resin and the polybasic carboxylic acid or anhydride is unsatisfactory and after relatively short periods of time it is found that the mixture tends to advance in its state of cure so that ultimately if not employed within a reasonable time after addition of the acid or anhydride, the mixture becomes useless for most applications. A further disadvantage lies in the fact that when incorporated in the ethoxyline resin, there is a great tendency to lose the curing agent by vaporization when the materials are heated at elevated temperatures of the order of from 125° to 200° C.

It is also known that acids and bases particularly organic nitrogen-containing bases give rapid cure of ethoxyline resins when employed as curing agents but the products are found to have relatively poor high temperature properties and also their pot life, which refers to the length of time during which a resinous mass or solution remains usable, is usually very short. A pot life is generally desired such that the resin retain its ability to be manipulated (e.g., sprayed, roller-coated, poured, etc.) in a manner similar to a freshly prepared resin at room temperature.

In the present investigation, it has been found, for example, that alkyl titanate when used as curing agents for lower molecular weight ethoxyline resins, gives end products with better temperature stability in the cured state but the cure time is exceedingly long and therefore impractical. Unexpectedly, it has been found that by preparing well-defined mixtures of particular ethoxyline resins, an alkyl titanate, an organic nitrogen containing base having at least one nitrogen atom per molecule and no more than one hydrogen atom on each nitrogen atom, said base containing no other reactive groups, a product is obtained which cures at a suitable rate and which simultaneously has the high temperature strength, for example, of the product cured with an alkyl titanate alone.

It was also found, contrary to most catalyst-containing epoxy systems, that the present epoxy compositions have good shelf life in the presence of the added catalyst combination.

In accordance with the present invention, simultaneous rapid cure of ethoxyline resins, together with excellent high temperature properties, has been obtained by incorporating in the ethoxyline resin a mixed curing agent comprising (1) an organic nitrogen containing base having at least one nitrogen atom per molecule and no more than one hydrogen atom on each nitrogen atom, said base containing no other reactive groups, that is, groups which are reactive with the ethoxyline resin or the alkyl titanate, with (2) an organic titanium ester. Examples of reactive groups include hydroxyl or carboxyl groups as well as multiple hydrogenous atoms on nitrogen atoms. Rapid cure and excellent high temperature properties have been obtained in ethoxyline resins by employing as the mixed curing agent the above-described nitrogen-containing base and an alkyl titanate. The product obtained in accordance with this preferred embodiment cured at a rate somewhat slower than with the base alone in usual curing amounts, but had the high temperature strength of a product cured with alkyl titanate alone. The ethoxyline resins used in this connection should have a low hydroxyl content, that is, each resin molecule should have not more than one hydroxyl group per molecule and preferably less than 0.2 hydroxyl groups per molecule.

It has now unexpectedly been discovered that compositions of the aforementioned ethoxyline resins may be prepared which are eminently useful in many applications and which have properties which are superior to the properties and compositions of ethoxyline resins heretofore prepared and used for the same purposes. More particularly, it has been found that the combination of an ethoxyline resin together with a nitrogen-containing base as above with an alkyl titanate has properties which obviate substantially all the difficulties heretofore encountered when using the curing agents of the prior art. For example, the resulting compositions have a longer pot life and longer shelf life than prior ethoxyline resin compositions, even in the presence of the catalyst. Additionally, they have better physical properties, namely are less brittle and tougher at elevated temperatures.

The alkyl titanates found eminently suitable as curing agents in combination with the above bases correspond to the general formula $$Ti(OR)_4$$

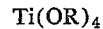

wherein R is a radical selected from the group consisting of the saturated and unsaturated aliphatic hydrocarbon radicals, for example, methyl, ethyl, etc., and vinyl, alkyl, etc., aryl, aralkyl, alkaryl and cycloaliphatic radicals, among others. Specific examples of alkyl titanates which may be employed include those substituted by methyl, ethyl, propyl, isopropyl, n-butyl, isobutyl, secondary butyl, tertiary butyl, etc. radicals, vinyl, allyl, butenyl radicals, etc., phenyl, naphthyl, benzyl, cinnamyl and substituted phenyl or naphthyl, tolyl, xylyl and phenylethyl radicals, various cycloaliphatic esters such as tetracyclohexyl. These compounds may comprise in addition mixed esters having two or more different radicals of the group enumerated. Representative examples of nitrogen containing bases as defined above include amines such as piperidine, pyridine, dibutylamine, triethylamine, tributylamine, morpholine, N cocomorpholine, trimethylamine, diethylamine, dibutylamine, and derivatives of these amines as, for instance, piperidine benzoate, piperidine salt of pentamethylamine dithiocarbamic acid, the diethylamine salt or diethyl dithiocarbamic acid, and a combination of piperidine with benzaldehyde. Another example of nitrogen containing bases or amines useful in conjunction with this invention is dimethyl soya amine. Other useful bases of the type described will occur to those skilled in the art.

The above-described ethoxyline resins are disclosed in the aforesaid Castan Patent 2,324,483, as well as Castan Patent 2,444,333, British Patent 518,057 and British Patent 579,698. Essentially these ethoxyline resins are based on the resinous product of reaction between an epihalohydrin, for instance, epichlorohydrin and a phenol having at least two phenolic hydroxy groups, for example, bis-(4-hydroxyphenyl) dimethyl propane. Further examples of ethoxyline resins which may be employed in the practice of the present invention are disclosed in U.S. Patents 2,494,295, 2,500,600 and 2,511,913. By reference, the aforementioned patents are intended to be part of the present description of the ethoxyline resins used and, for brevity, the ethoxyline resins will not be described other than that they contain more than one ethylene oxide group, e.g., from one to two or more epoxide groups per molecule and may be prepared by effecting reaction between a polyhydric phenol or alcohol, for example phenol, hydroquinone, resorcinol, glycerine and condensation products of phenols with ketones, for instance, bis-(4-hydroxylphenyl)-2,2-propane, with epichlorohydrin. For example, the reaction of epichlorohydrin with bis-(4-hydroxylphenyl)-2,2-propane may be formulated as follows:

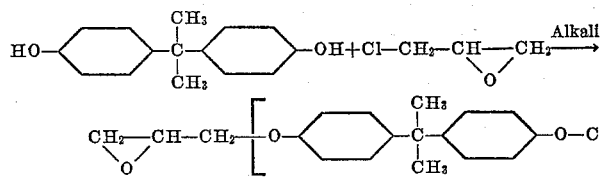

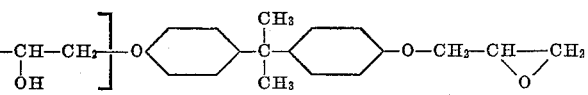

where $n$ has an average value varying from around zero to about 9. Many of these ethoxyline resins are sold under the name of Epon resins by Shell Chemical Corporation, or Araldite resins by the Ciba Company. Data on several of the Epon resins found suitable for the instant purpose are given in the table below:

TABLE I

| Epoxy Resin | Epoxide Equivalent | M.P., °C. | Hydroxyl Content (OH groups/molecule) |
| --- | --- | --- | --- |
| Epon 820 | 192 | Liquid | 0.2–0.4 |
| Epon 828 | 192 | 9 | 0.2–0.4 |
| Epon 834 | 225–290 | 20–28 | 0.5 |
| Epon 1064 | 300–375 | 40–45 | 0.75–1.00 |
| Araldite 6010 | 192 | Liquid | 0.2–0.4 |
| Araldite 6020 | 200–205 | ---do--- | 0.2–0.4 |
| ERL 2774 | 175–200 | ---do--- | 0.2–0.4 |
| Epi-Rez 510 | 175–200 | ---do--- | 0.2–0.4 |
| Bakelite 2774 | 190–196 | ---do--- | 0.2–0.4 |

The complex epoxides used with the above-described curing agents contain epoxide groups or epoxide and hydroxyl groups as their functional groups and are generally free from other functional groups such as basic and acidic groups.

The proportions of ethoxyline resin and base with titanium-containing compounds which may be employed can be varied within wide limits depending upon the application for which the mixture is intended, the type of ethoxyline resin employed, etc. Generally, there is employed for every 100 parts of ethoxyline resin a base in an amount ranging from about 0.1 part to about 6 parts, preferably about 0.1 to 3 parts, and from about 0.2 to 10.0 parts, preferably about 2 to 6 parts, of the titanium compound.

The method by which the ethoxyline resin and the mixture of curing agents are combined can be varied and usually depends upon the ultimate use to which the composition is to be put. For example, in preparing a casting mixture, the resin, alkyl titanate and base are mixed together and cured at an elevated temperature. Curing temperatures may range from 100 to 160° C. or higher, with longer curing periods required at lower temperatures. When the composition is to be used as an impregnant or binder for laminates, two separate mixtures are preferably prepared containing in one (a) the resin, (b) the alkyl titanate, and (c) the base, and in the second a mixture of solvents comprising, for example, acetone and toluene. Preferably, although not necessarily, the two mixtures are prepared separately, then combined, and a material such as glass cloth, for example, coated with the resulting solution and air-dried for a specific period. When the composition is to be used as a molding compound, the three basic ingredients, namely, the resin, the alkyl titanate and the base, are combined with a filler, for example chopped glass fibers and a material such as clay. Such mixture is blended in a mixer, stirred, and then placed in a mold and cured under pressure at 175° C. for about 2 to 3 hours or more.

In order that those skilled in the art may better understand how the present invention may be practiced, the following examples are given by way of illustration and not by way of limitation. All parts are by weight.

*Example 1*

A resinous casting mixture was prepared by mixing 50 parts of the previously described Epon 828, 0.5 part piperidine and 2.5 parts tetrabutyl titanate. This mixture was heated at a temperature of 160° C. At the end of 4 hours the resulting resin was fairly hard. Continued heating at 160° C. for a total of 20 to 24 hours gave a resinous product having a Shore C hardness of 93. The power factor at 60 cycles of this cast resin was 0.0089 at room temperature and 0.169 at 165° C.

By way of comparison a mixture of 50 parts of the same Epon resin and five parts of piperidine, in the absence of a titanate, was cured for 20 to 24 hours at 160° C. to a resinous product having a Shore C hardness of 79. This cast resin had a power factor at 60 cycles of 0.829 at 165° C.

For further comparison, a mixture of 50 parts of the same resin and 2.0 parts of tetrabutyl titanate, in the absence of piperidine, was cured at a temperature of 160° C. for 20 to 24 hours to give a product with a wrinkled surface having a hardness of 95. However, it was not hard at the end of four hours.

*Example 2*

A resinous composition similar to that of Example 1 was prepared by mixing 100 parts of the same ethoxyline resin, 5.0 parts of tetrabutyl titanate and 1.0 part of piperidine and curing at 160° C. After approximately two days at 160° C., the product had a hardness much greater than a corresponding sample, cured for the same period at 160° C. that contained piperidine but no titanate. For instance, a piece cast from the above formulation had a Shore C hardness of 95 at 160° C. while a piece, cured for the same period at 160° C., which contained piperidine but no titanate had a hardness of only 72. The former piece could not be cut while hot, whereas the latter piece could be readily punctured at the same temperature.

Example 3

Another casting composition was prepared by mixing 100 parts of Epon 834 previously described, 5.0 parts of tetrabutyl titanate and 1.0 part of piperidine. Using the procedure described in Example 1, a casting resin having comparable properties was obtained.

In similar manner, 100 parts of a mixed ethoxyline composition comprising 50% Epon 834 and 50% Epon 828 was modified with 5.0 parts of tetrabutyl titanate and 1.0 part of piperidine and cured at 160° C. for from 20 to 24 hours. This cured product had hardness properties comparable to those of the afore-going examples.

It also has been found that ethoxyline resins of the above-described class can be employed satisfactorily as laminating varnishes if they contain a mixture of curing agents coming within the scope of this invention. Thus, it has been found that ethoxyline resin compositions, containing the above-described curing agents can be employed in preparing a "dry lay-up." A dry lay-up is made by laminating pre-impregnated material, such as glass cloth, which is dry or slightly tacky to the touch. In the instant method, the dry or slightly tacky condition is obtained due to the partial curing of the resin. The advantage of the dry lay-up technique is in its ease of handling and forming. As far as it is known, the present method is the first satisfactory method that permits dry lay-up laminates without requiring ethoxyline hot melts or other special techniques. The following example is illustrative of the process of preparing "dry lay-ups" employing the ethoxyline resins of the present invention.

Example 4

A resin composition was prepared by mixing 250 parts of 828, 12.5 parts of tetrabutyl titanate and 2.5 parts of piperidine. A mixture of solvents comprising 25 parts of acetone and 35 parts of toluene was separately prepared. The resin composition and the mixed solvents were then combined and the resinous solution was employed to coat glass cloth which was subsequently air-dried for from 15 to 30 minutes. The coated glass cloth was then precured for 45 to 50 minutes at 160° C. and then allowed to cool. This cloth was then suitable for "dry lay-ups."

A "dry lay-up" was prepared by cutting a number of pieces of the above-described precured cloth to desired laminate size. Pieces were superposed upon each other and pressed at about 10,000 p.s.i. at 177° C. for one hour. The laminate so prepared had a flexural strength at room temperature of 70,000 lbs. per sq. in.

The following example illustrates the use of modified ethoxyline composition of the present invention in preparing a molding composition.

Example 5

A liquid mixture comprising 400 parts of 828, 4 parts of piperidine and 20 parts of tetrabutyl titanate was prepared and poured into a mixer containing a mixture of 150 parts of half-inch chopped glass fibers and 450 parts of clay. This combined mixture was stirred and blended for 2 to 5 minutes. The material was then removed from the mixer and placed in a mold. The molded piece was cured at 175° C. in a press for 2 to 3 hours. The product obtained was very tough and had a smooth glossy finish.

After postcuring at 160° C. for 72 hours, the molded piece had excellent resistance to mechanical shock at that temperature.

Example 6

In this example a casting resin was prepared by employing a curing agent comprising tetra-(2-ethylhexyl) titanate and piperidine using the technique described in preparing the casting resins of the earlier examples. Such a casting resin which cured to an excellent product with a hard smooth surface having a hardness of 93 was prepared from 50 parts of 828, 3.4 parts tetra-(2-ethylhexyl) titanate, and 0.5 part piperidine.

Example 7

Another casting resin was prepared in the manner of the previous examples by employing 50 parts 828, 2.5 parts of a polymer comprising condensed tetrabutyl titanate and 0.5 part of piperidine. A product cured for 20 to 24 hours at 160° C. had a hardness of 80.

Example 8

A smooth hard resinous product having a hardness of 90 was prepared from 50 parts of 828, 2.1 parts of tetra-isopropyl titanate, and 0.5 part of piperidine by curing for 20 to 24 hours at 160° C.

The compositions below were prepared as in the case of Example 1 by heating the mixture of ingredients, in parts by weight, to 160° C. After four hours at this temperature, the composition had cured to a hard mass, having a Shore C hardness of about 90–100. The power factors were as shown, being at 60 cycles per second and 10 volts per mil at the particular temperatures shown.

Example 9

100 parts Araldite 6010
3 parts tetrabutyltitanate
2 parts tetra-(2-ethylbutyl) titanate
1 part bispiperidinomethane
  Power factor:
    25° C.—0.09%
    100° C.—1.7%
    130° C.—4.9%

Example 10

100 parts Araldite 6020
4 parts tetrabutyltitanate
1 part dimethylbenzylamine
  Power factor:
    25° C.—0.31%
    100° C.—0.8%
    130° C.—3.6%

Example 11

100 parts Epon 828
3 parts tetrabutyltitanate
1.5 parts tributylamine
  Power factor:
    25° C.—0.2%
    100° C.—1.8%
    130° C.—5.5%

Example 12

100 parts Araldite 6020
5 parts tetrabutyltitanate
2 parts pyridine
  Power factor:
    25° C.—0.2%
    100° C.—3.0%
    130° C.—11.0%

Example 13

100 parts Araldite 6020
6 parts tetraisopropyltitanate
2 parts 2-vinyl pyridine
  Power factor:
    25° C.—0.15%
    100° C.—3.0%
    130° C.—7.9%

Example 14

50 parts Epon 828
50 parts Epon 834
5 parts tetrabutyltitanate
1 part α-methylbenzyldimethylamine
Power factor:
    25° C.—0.09%
    100° C.—1.7%
    130° C.—4.0%

In Examples 15 and 16 below, the ethoxyline resin was prepared by reacting a phenol formaldehyde resin with epichlorohydrin, such resin being made by Dow Chemical Company and designated X–2638.2 and having a content of about one hydroxyl radical per molecule. The ingredients were heated to 40° C. before mixing and treating as above.

Example 15

100 parts Ethoxyline resin
2 parts tetrabutyltitanate
3 parts Armeen M2S (methyl disoya amine)
Power factor:
    25° C.—0.5%
    100° C.—2.5%
    130° C.—6.5%

Example 16

100 parts Ethoxyline resin
4 parts tetraisopropyltitanate
3 parts α,α' dibenzylmethylamine
Power factor:
    25° C.—0.35%
    100° C.—7.0%
    130° C.—27.0%

In Example 17 below, the Epon 1310 ethoxyline resin used is manufactured by the Shell Development Company and is the polyglycidyl ether of 1,1',2,2'-tetrakis (hydroxyphenyl) ethane. The procedure was as in Example 1 above with slight heating during mixing.

Example 17

50 parts Epon 1310
50 parts Epon 828
6 parts tetrabutyltitanate
1 part bispiperidinoethane
Power factor:
    25° C.—0.4%
    100° C.—1.0%
    130° C.—2.0%

Example 18

Example 17 was repeated using:

50 parts Epon 1310
50 parts Araldite 6010
5 parts tetrabutyltitanate
1.5 parts N cocomorpholine
Power factor:
    25° C.—0.43%
    100° C.—1.6%
    130° C.—5.7%

Example 19

A filling and bonding compound useful for making electrical coils was prepared as in Example 1 by combining the following ingredients:

100 parts Araldite 6010
5 parts tetrabutyltitanate
1.5 parts Armeen DMSD
32 parts silica filler (sand)

The compound prepared as above had a shelf life of about one month. Armeen DMSD is an Armour Chemical Division product and is a tertiary amine comprising dimethyl soya amine.

Example 20

The following materials were mixed together as in Example 1 above:

100 parts Epon 828
1.5 parts triethanolamine
5 parts tetrabutyltitanate

After heating for 16 hours at 160° C., only a soft, gummy, unusable mass resulted.

This demonstrates that when a nitrogen-base material having reactive groups other than the single hydrogen atom per nitrogen atom is used, the end product is not useful from the point of view of the present invention since such materials do not cure within a reasonable time.

Example 21

A 33⅓% by weight solution of Epon 1007 and methylene chloride was prepared, Epon 1007 having 5–8 OH radicals per molecule. To 300 parts of the solution, there were added 6 parts of tertiary butyl titanate and 1 part of dimethyl soya amine. The material gelled at once, showing that ethoxyline resins not flowing within the range specified are not useful.

Example 22

To 300 parts of a 33⅓% solution of Epon 1007 in methylene chloride, there were added 5 parts of tertiary butyl titanate and 1½ parts of triethanolamine. No immediate gelling took place. However, when the methylene chloride was evaporated off, a hard resin remained which would not redissolve in the methylene chloride. This example shows that ethoxyline resins having an OH radical occurrence over and above that of the ethoxyline resins prescribed in the present invention, when cured with an alkyl titanate and a nitrogen-base material having reactive constituents other than a single hydrogen atom per each nitrogen atom, as specified, have a short shelf life.

Example 23

The compositions of this invention are very useful in providing insulation for wires and generator bars or coils which does not puff, expand or distort upon curing. This is because it is possible to prepare the coated wire which is used as such or placed in the generator bar in the dry or essentially dry condition or with no solvent content before curing. For example a composition containing by weight 50 parts Epon 1310
50 parts Epon 828
5 parts Tetrabutyl titanate
1 part Armeen DMSD was dissolved in methyl ethyl ketone to a resin solids content of 70% by weight. Individual generator bar wires were coated with an asbestos pulp impregnated with the above resin material the coated wires being then heated to drive off the solvent. The coated wires were then assembled into a generator bar with pressure and heat of 140°–160° C. using a glass fabric separator impregnated with the same resin which had also been heated to drive off the solvent to separate adjoining stacks of coated wires. Over the entire assembled bare bar was placed a resin impregnated mica mat insulation impregnated with the same resin. When cured under heat and pressure, the outer insulation layer showed no expansion, puffing or distortion. Other bars were prepared using the above resin for impregnating the wire coating and separator and other solvent containing resins such as polyesters, asphalt base compounds, epoxy resins etc. in the outer bar insulation and these showed little or no puffing indicating that when the individual wires and separators are insulated using the present resin as above, puffing of the outer insulation of generator bars embodying the wire so insulated is negligible. The other curing agent combinations of this invention have been used with like results in this connection. This invention is adaptable to and useful in the fabrication of the various types of generator bars which are well known to those skilled in the art.

In addition to the compositions described above, various other products may be prepared by varying the mixture of resins or partially precondensed resins, curing agents and fillers. Additional fillers which may be employed include titanium dioxide, various clays, iron oxide, carbon, graphite, asbestos fibers, etc.

From the above, it will be clearly apparent that the properties of final polymer composition comprising the ethoxyline resin and the mixture of curing agents described herein have advantages over those in which only a base per se is employed with the ethoxyline resin or in which only an alkyl titanate is employed as a curing agent. It will also be obvious that the particular ethoxyline resins, and more specifically their hydroxyl content, are very important in connection with the present invention. The advantages which accrue to the present invention include increased potting life, increased storage or shelf stability of the catalyzed composition, superior heat stability at elevated temperatures, and an unexpectedly good use in the preparation of "dry lay-ups," which use is unexpected from the nature of the ethoxyline resins themselves.

What we claim as new and desire to secure by Letters Patent of the United States is:

1. A composition of matter comprising (1) a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups, (2) a curing agent for (1) comprising (a) from about 0.1 to about 6 percent by weight of an organic nitrogen-containing base having at least one hydrogen atom per molecule and no more than one hydrogen atom on said nitrogen atom, said base being devoid of other reactive groups and (b) from about 0.2 to about 10 percent by weight of an alkyl titanate, the weights of said curing agents being based on the weight of the epoxide resin.

2. A molding composition comprising (1) a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups, (2) a curing agent for (1) comprising (a) from about 0.1 to about 6 percent by weight of an organic nitrogen-containing base having at least one nitrogen atom per molecule and no more than one hydrogen atom on said nitrogen atom, said base being devoid of other reactive groups and (b) from about 0.2 to about 10 percent by weight of an alkyl titanate, the weights of said curing agents being based on the weight of the epoxide resin and (3) a filler for said composition.

3. An impregnating and coating agent for preparing laminated products comprising (1) a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups, (2) a curing agent for (1) comprising (a) from about 0.1 to about 6 percent by weight of an organic nitrogen-containing base having at least one nitrogen atom per molecule and no more than one hydrogen atom on said nitrogen atom, said base being devoid of other reactive groups and (b) from about 0.2 to about 10 percent by weight of an alkyl titanate, the weights of said curing agents being based on the weight of the epoxide resin and (3) a non-reactive solvent for (1) and (2).

4. A laminated product comprising a plurality of sheets coated and impregnated with a composition comprising (1) a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups, (2) a mixture of two different curing agents for (1) comprising (a) from about 0.1 to about 6 percent by weight of an organic nitrogen-containing base, said organic nitrogen-containing base having at least one nitrogen atom per molecule, no more than one hydrogen atom on said nitrogen atom, said base being devoid of other reactive groups, and (b) from about 0.2 to about 10 percent by weight of an alkyl titanate compound, the weights of said curing agents being based on the weight of said epoxide resin.

5. The process of curing a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups which comprises heating said epoxide resin at a temperature of from about 100° to 160° C. in admixture with curing agents comprising from about 0.1 to about 6 percent by weight of an organic nitrogen-containing base having at least one nitrogen atom per molecule and no more than one hydrogen atom on said nitrogen atom, said base being devoid of other reactive groups and from about 0.2 to about 10 percent by weight of an alkyl titanate, the weights of said curing agents being based on the weight of the epoxide resin.

6. The method of preparing a laminated product which comprises coating a plurality of sheets with a composition comprising (1) a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups, (2) a mixture of two different curing agents comprising (a) from about 0.1 to about 6 percent by weight of an organic nitrogen-containing base, said organic nitrogen-containing base having at least one nitrogen atom, no more than one hydrogen atom on said nitrogen atom, said base being devoid of other reactive groups and (b) from about 0.2 to about 10 percent by weight of an alkyl titanate, the weight of said curing agents being based on the weight of said epoxide resin and (3) a solvent for said complex epoxide resin and said curing agents, air drying the coated sheets, precuring the coated sheets at an elevated temperature to obtain the said dry layups, superimposing said sheets upon each other and molding the assembly under heat and pressure for a time sufficient to cure the laminated product.

7. The method of preparing a laminated product which comprises coating a plurality of sheets with a composition comprising (1) a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups, (2) a mixture of two different curing agents comprising (a) from about 0.1 to about 6 percent by weight of an organic nitrogen-containing base, said organic nitrogen-containing base having at least one nitrogen atom, no more than one hydrogen atom on said nitrogen atom, said base being devoid of other reactive groups and (b) from about 0.2 to about 10 percent by weight of an alkyl titanate and the weights of said curing agents being based on the weights of said epoxide resin superimposing said sheets upon each other and molding the assembly under heat and pressure for a time sufficient to cure the laminated products.

8. A composition of matter comprising (1) a complex epoxide resin having not more than about one hydroxyl group per molecule, comprising a polyether derivative of a polyhydric phenol containing epoxy groups obtained by reacting bis-(4-hydroxyphenyl)-2,2-propane and epichlorohydrin and (2) a mixture of different curing agents for (1) comprising (a) from about 0.1 to about 6 percent by weight of piperidine and (b) from about 0.2 to about 10 percent by weight of tetrabutyl titanate, the weights of said curing agents being based on the weight of the epoxide resin.

9. A composition of matter comprising (1) a complex epoxide resin having not more than about one hydroxyl group per molecule, comprising a polyether derivative of a polyhydric phenol containing epoxy groups obtained by reacting bis-(4-hydroxyphenyl)-2,2-propane and epichlorohydrin and (2) a mixture of different curing agents for (1) comprising (a) from about 0.1 to about 6 percent by weight of piperidine and (b) from about 0.2 to about 10 percent by weight of tetraisopropyl titanate, the weights of said curing agents being based on the weight of the epoxide resin.

10. A composition of matter comprising (1) a complex epoxide resin having not more than about one hydroxyl group per molecule, comprising a polyether derivative of a polyhydric phenol containing epoxy groups obtained by reacting bis-(4-hydroxyphenyl)-2 2-propane and epichlorohydrin and (2) a mixture of different curing agents for (1) comprising (a) from about 0.1 to about 6 percent by weight of dimethyl soya amine and (b) from about 0.2 to about 10 percent by weight of tetrabutyl titanate, the weights of said curing agents being based on the weight of the epoxide resin.

11. A composition of matter comprising (1) a complex epoxide resin having not more than about one hydroxyl group per molecule, comprising a polyether derivative of a polyhydric phenol containing epoxy groups obtained by reacting bis-(4-hydroxyphenyl)-2,2-propane and epichlorohydrin and (2) a mixture of different curing agents for (1) comprising (a) from about 0.1 to about 6 percent by weight of methyl disoya amine and (b) from about 0.2 to about 10 percent by weight of tetrabutyl titanate, the weights of said curing agents being based on the weight of the epoxide resin.

12. A composition of matter comprising (1) a complex epoxide resin having not more than about one hydroxyl group per molecule, comprising a polyether derivative of a polyhydric phenol containing epoxy groups obtained by reacting bis-(4-hydroxyphenyl)-2,2-propane and epichlorohydrin and (2) a mixture of different curing agents for (1) comprising (a) from about 0.1 to about 6 percent by weight of tributyl amine and (b) from about 0.2 to about 10 percent by weight of tetrabutyl titanate, the weights of said curing agents being based on the weight of the epoxide resin.

13. A composition of matter comprising (1) a complex epoxide resin having not more than about one hydroxyl group per molecule, comprising a polyether derivative of a polyhydric phenol containing epoxy groups obtained by reacting bis-(4-hydroxyphenyl)-2,2-propane and epichlorohydrin and (2) a mixture of different curing agents for (1) comprising (a) from about 0.1 to about 6 percent by weight of N cocomorpholine and (b) from about 0.2 to about 10 percent by weight of tetrabutyl titanate, the weights of said curing agents being based on the weight of the epoxide resin.

14. The process of curing a complex epoxide resin having not more than about one hydroxyl group per molecule, comprising a polyether derivative of a polyhydric phenol containing epoxy groups obtained by reacting bis-(4-hydroxyphenyl)-2,2-propane and epichlorohydrin which comprises heating said epoxide resin at a temperature of about 160° C. in admixture with a mixture of different curing agents comprising (a) from about 0.1 to about 6 percent by weight of piperidine and (b) from about 0.2 to about 10 percent by weight of tetrabutyl titanate, the weights of said curing agents being based on the weight of the epoxide resin.

15. The process of curing a complex epoxide resin having not more than about one hydroxyl group per molecule, comprising a polyether derivative of a polyhydric phenol containing epoxy groups obtained by reacting bis-(4-hydroxyphenyl) - 2,2 - propane and epichlorohydrin which comprises heating said epoxide resin at a temperature of about 160° C. in admixture with a mixture of different curing agents comprising (a) from about 0.1 to about 6 percent by weight of piperidine and (b) from about 0.2 to about 10 percent by weight of tetraisopropyl titanate, the weights of said curing agents being based on the weight of the epoxide resin.

16. An impregnating and coating agent for preparing laminated products comprising (1) a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups, (2) a mixture of two different curing agents for (1) comprising (a) from about 0.1 to about 6 percent by weight of a member selected from the group consisting of acidic and basic agents said basic agent having at least one nitrogen atom per molecule and no more than one hydrogen atom on said nitrogen atom, said basic agent being devoid of other reactive groups and (b) from about 0.2 to about 10 percent by weight of an alkyl titanate, the weights of said curing agents being based on the weight of the epoxide resin, and (3) a solvent for (1) and (2).

17. The heat-hardened product of claim 5.
18. The heat-hardened product of claim 14.
19. The heat-hardened product of claim 15.

20. A generator coil comprising a plurality of wires having an insulating coating impregnated with a composition comprising (1) a complex epoxide resin having not more than about one hydroxyl group per molecule, containing epoxy groups and comprising a polyether derivative of a polyhydric organic compound selected from the class consisting of polyhydric alcohols and phenols having at least two phenolic hydroxy groups, (2) a curing agent for (1) comprising (a) from about 0.1 to about 6 percent of an organic nitrogen-containing base having at least one nitrogen atom per molecule and no more than one hydrogen atom on said nitrogen atom, said base being devoid of other reactive groups and (b) from about 0.2 to about 10 percent by weight of an alkyl titanate, the weights of said curing agents being based on the weight of the epoxide resin.

References Cited in the file of this patent

UNITED STATES PATENTS

| | | |
|---|---|---|
| 2,601,243 | Botts | June 24, 1952 |
| 2,656,290 | Berberich et al. | Oct. 20, 1953 |
| 2,682,490 | Game et al. | June 29, 1954 |
| 2,709,174 | Rust | May 24, 1955 |
| 2,728,744 | May et al. | Dec. 27, 1955 |
| 2,733,222 | Beacham | Jan. 31, 1956 |
| 2,742,448 | Beacham et al. | Apr. 17, 1956 |
| 2,773,048 | Formo et al. | Dec. 4, 1956 |
| 2,774,748 | Howard et al. | Dec. 18, 1956 |

OTHER REFERENCES

"Modern Plastics," November 1950, pages 113–122.

UNITED STATES PATENT OFFICE
CERTIFICATION OF CORRECTION

Patent No. 2,962,410                              November 29, 1960

Leo S. Kohn et al.

It is hereby certified that error appears in the above numbered patent requiring correction and that the said Letters Patent should read as corrected below.

Column 7, line 21, Example 15, for "(methyl disoya amine)" read -- dimethyl soya amine --; column 11, line 38, for "methyl disoya amine" read -- dimethyl soya amine --.

Signed and sealed this 11th day of July 1961.

(SEAL)
Attest:

ERNEST W. SWIDER                         DAVID L. LADD

Attesting Officer                           Commissioner of Patents